May 11, 1954 C. W. CLARK ET AL Re. 23,825
ROTARY DRUM APPARATUS AND MEANS FOR PREVENTING MATERIAL BEING TREATED FROM ACCUMULATING THEREON
Original Filed June 20, 1951
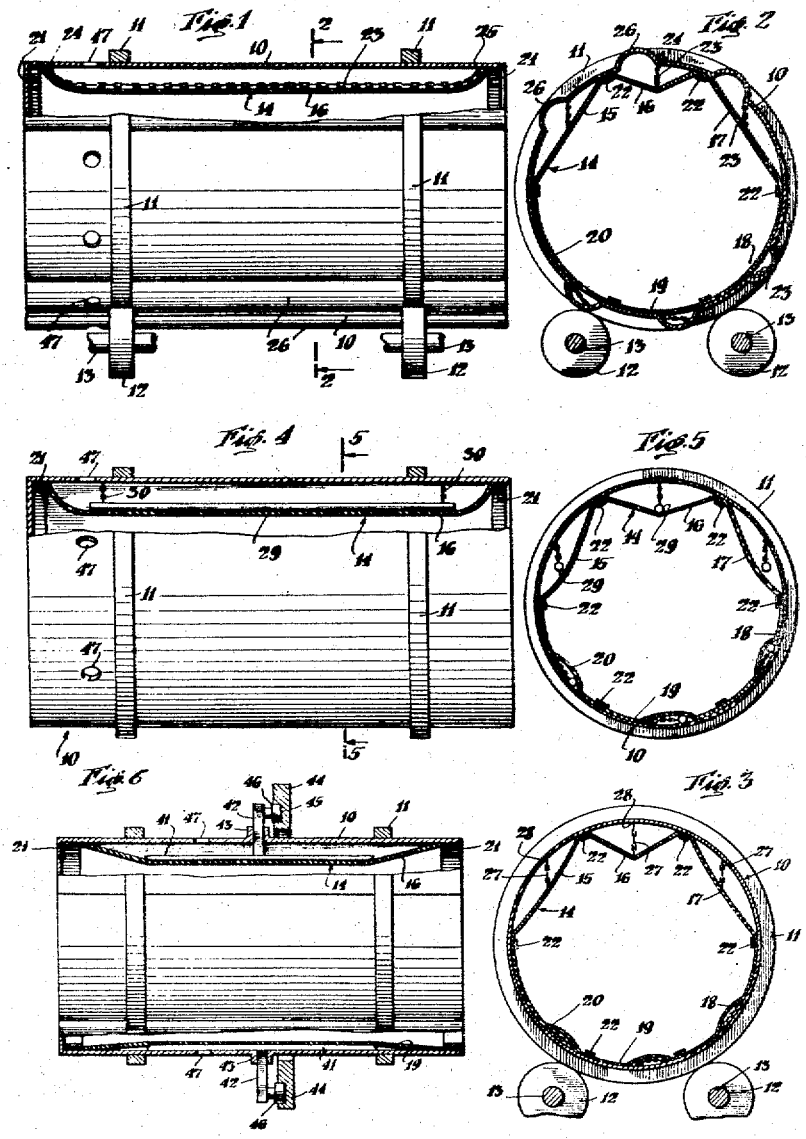
INVENTORS
CHARLES W. CLARK
BERNARD H. MORRISON
BY Robert S. Dunham
ATTORNEY Reissued May 11, 1954 Re. 23,825

UNITED STATES PATENT OFFICE 23,825

ROTARY DRUM APPARATUS AND MEANS FOR PREVENTING MATERIAL BEING TREATED FROM ACCUMULATING THEREON

Charles W. Clark, Toronto, Ontario, and Bernard H. Morrison, Noranda, Quebec, Canada, assignors to Noranda Mines Limited, Toronto, Ontario, Canada, a corporation of Canada Original No. 2,603,832, dated July 22, 1952, Serial No. 232,568, June 20, 1951. Application for reissue October 19, 1953, Serial No. 387,086

16 Claims. (Cl. 18—1)

Matter enclosed in heavy brackets [ ] appears in the original patent but forms no part of this reissue specification; matter printed in italics indicates the additions made by reissue.

Our present invention relates to a rotary drum apparatus and means for preventing material being treated from accumulating thereon. More particularly, the present invention relates to rotary drum apparatus for treating material containing fines in a form in which the material tends to adhere to and accumulate on the walls of the apparatus, and wherein the drum apparatus is provided with a flexible lining secured to the apparatus at least at its peripheral portions and free to move in respect to the drum between such peripheral portions. In such an apparatus it is the purpose of the present invention to provide means for flexing the lining so as to dislodge material accumulated thereon.

Apparatus embodying the present invention is susceptible of a variety of uses and is not restructed to being used with any particular material. Among other uses for this type apparatus is, for example, in the treatment of iron ores to produce a charge suitable for the metallurgical recovery of iron, including ores which are concentrated to form a charge relatively high in iron content as compared with the original ore. Some taconite and magnetite ores are now being concentrated in this manner. Such ores may be mixed in apparatus according to the present invention, for example, to permit a subsequent sintering operation to be carried out thereon. Such operations do not necessarily include the formation of pellets or nodules from the ores or concentrates thereof, but may in certain instances include such pelletizing or nodulizing. The present invention is intended for use in any and all applications in which the advantages thereof may be found desirable.

One form of apparatus in which material of the kind referred to is being treated is a drum used for treating moist pyrite, which is of a very small particle size, as a flotation concentrate wherein over 90% of the particles will pass through a 325-mesh screen. It is desired to form this material into small pellets or nodules so as to treat the nodulized material by the process disclosed in Renken, U. S. Patent No. 2,530,630, issued November 21, 1950.

Nodules or pellets may be formed from substantially pulverulent material mixed with a liquid or semi-liquid binder by feeding such mixed material into a rotary drum, so that the nodules are formed by particles rolling over the loose material, as a snow ball is sometimes made up. One such binder which has been used with good results with fine pyrite is water. It is found, however, that material of this kind tends to adhere to the walls of the rotary drum and to accumulate thereon. Finally, large masses of unpelletized material may drop off in chunks from the inside wall portions of the drum when such portions are at an upper part of their rotational paths, which seriously interferes with the desired operations.

Various arrangements have been suggested, and some tried, to overcome the difficulties above outlined. For example, one or more scrapers, such as a heavy bar scraper, may be provided inside the rotary drum in a substantially stationary position, so that the drum rotates in respect thereto. When forming nodules from pyrite fines, as aforesaid, it was found that the scraper wore quite rapidly and also acted as a continuous brake upon the rotation of the drum, thus substantially increasing the power required to rotate the drum.

An arrangement was then provided including a plurality of knockers, that is, weighted arms pivoted to the drum and arranged to knock against it at least once during each revolution. Even these devices were relatively unsatisfactory. It was found that if the drum were heavy enough, so as not to be substantially damaged by the succession of impacts from the knockers, then the knockers were not efficient in dislodging material adhering to and accumulated on the inside of the drum. Heavy pads were required under the points of impact in order to prevent damage to the drum. This caused a loss of efficiency as to the ability of the knockers to dislodge the adhering material.

It has also been proposed to install reciprocating cutters to keep the drum clean. In this way the braking action is minimized; but the construction was quite complicated and relatively expensive as a substantial amount of mechanism was required to reciprocate the cutters.

The present invention may be summarized as a rotary drum for the purposes generally set forth, which drum is mounted for rotation about a substantially horizontal or slightly inclined axis and which is provided with a lining of *substantially impervious* flexible sheet material, such as rubber or reinforced rubber, coupled with *mechanical* means to exert force intermittently on the outer surface of the sheet material of the lining facing the rigid drum for intermittently flexing the lining by moving it in respect to the drum, thereby tending to dislodge material accumulated on the inner surface of the lining. *The lining is impervious to the material to be handled in the drum as herein set forth, including the nodules to be formed in the drum, the solid fine particles of*

*material of which the nodules are formed, and the liquid, such as water, used in forming the fine material into nodules.* This flexible lining is secured to the drum around its periphery, but is free to move in respect thereto at portions other than its periphery. In a preferred form, the lining is made up of a plurality of longitudinally extending panels, each extending substantially from end to end of the drum, and each secured to the drum by suitable means around its entire periphery and preferably in an air-tight manner. Associated with the lining, and preferably with each of these panels *and located at least in part between the drum and the lining* is a means for intermittently applying a [flexible] *flexing* force to the outer surface of the lining at a portion or portions thereof free to move with respect to the drum. The resultant flexing of the lining serves in practice to prevent undesired accumulation of the material being treated on the inside of the lining. One type of this force applying flexing means comprises a relatively heavy swingable means, which may include one or a plurality of chains, or may comprise an elongated weighted member secured to the inside of the drum and swingable in respect thereto. In some instances it may be desired to provide a recess in the drum open to the interior thereof, into which the swingable means may pass or in which it may be received during the movement of such means through a preferred zone such as the lower part of its orbital path in the rotation of the drum. In [this] *this* way, the flexible lining may conform to the substantially cylindrical interior contour of the drum during this lower part of its movement. Another type of means for applying force to flex the lining for the same purpose comprises a means such as one or more longitudinally extending members or bars which may be moved in respect to the drum by positively acting mechanical means, such as a cam so arranged as to flex the lining at least once during each revolution of the drum and in response to the rotation thereof.

It has been found that means of these kinds are effective in keeping the lining substantially free from any large accumulation of material adhering thereto, particularly when used in forming pyrite nodules as aforesaid; and that the operation of forming nodules may proceed without interference from the difficulties outlined hereinabove, which have adversely affected prior art constructions used for this purpose.

Other and more detailed features and objects of the present invention will become apparent from the following description, and will be pointed out in the appended claims, all when considered in connection with the accompanying drawings, in which:

Figure 1 is a view substantially in elevation, but with a part broken away and in vertical section, showing one embodiment of the invention including an elongated chain connected to the drum at two longitudinally spaced points;

Fig. 2 is a view substantially in transverse vertical section taken on the line 2—2 of Fig. 1;

Fig. 3 is a view similar to Fig. 2 showing a modified form of the invention, particularly one in which a plurality of short lengths of heavy chain are used in lieu of the chains used in Figs. 1 and 2;

Fig. 4 is a view similar to Fig. 1 showing another embodiment of the invention, wherein elongated members are suspended by flexible suspension means from pairs of longitudinally spaced points respectively on the inside of the drum;

Fig. 5 is a view substantially in transverse vertical section on the line 5—5 of Fig. 4; *and*

[Fig. 6 is a view similar to that of Fig. 1 showing a still further embodiment of the invention, particularly one in which the flexing force is applied by the use of fluid pressure;]

[Fig. 7 is a view taken substantially on the line 7—7 of Fig. 6 illustrating a rotary distributing valve for fluid pressure; and]

Fig. [8] *6* is a view similar to that of Fig. 1 showing an additional embodiment of the invention wherein positively acting mechanical means are provided for flexing the lining.

While the device of the present invention may be used in drum apparatus for treating different types of materials including fines wherein such materials tend to adhere to or accumulate on the inside of the drum, the structure hereinafter specifically described is particularly useful in the formation of pellets or nodules made from pyrite fines, such as flotation concentrates, which may be agglomerated by adding thereto a desired amount of water as a binding agent. The use of the invention is not limited to the particular type of material above mentioned or even in the nodulizing of materials as distinguished from some other treatment thereof in this type of apparatus. As stated above, nodules formed of pyrite in apparatus according to the present invention may thereafter be treated by the processes disclosed and claimed in the U. S. patent to Renken, No. 2,530,630 aforesaid. Pyrite fines, which are mixed with a certain amount of water, tend to adhere to and accumulate on the inside surface of a nodulizing or pelletizing drum in which nodules or pellets are formed therefrom. By the use of the present invention, this accumulation of adherent material on the inside of the drum is effectively prevented.

Turning now to the accompanying drawings and particularly to Figs. 1 and 2 thereof, there is illustrated a drum 10, which may be of any suitable rigid construction, usually metallic and which is provided with a plurality of supporting and rotating bands 11. The bands 11 are suitably received upon rollers 12 which are mounted on shafts, as shown at 13, and which serve to support and/or drive the drum 10. As shown, the drum is mounted for rotation about a substantially horizontal axis. It is contemplated, however, if desired, the axis of the drum may be inclined slightly to the horizontal, for example, so as to have the discharge end of the drum at a slightly lower level than the other end thereof, so as to cause a flow of the material therethrough.

As shown, the right hand end of the drum, as seen in Fig. 1, is open and constitutes a discharge end. The left hand end, as seen in this figure, may be closed and material may be supplied to the drum through a suitable chute or conveyor (not shown). Alternately, the material to be formed into the pellets or nodules may be supplied to the left hand end of the drum, as seen in Fig. 1, by any suitable means (not shown), through an opening provided in this end. Inasmuch as the construction thus far described is entirely conventional, it has not been thought necessary to disclose it in greater detail or to provide a more detailed illustration thereof.

In accordance with the present invention, there is provided a lining generally indicated at 14 of flexible sheet material. Such lining may, for example, be sheet rubber having a thickness of perhaps ⅛" and may, if desired, be reinforced by a suitable cord reinforcing, such as used in construction of automobile tires. Other types of construction may be employed in lieu of sheet rubber, the only requirement being that the lining shall be reasonably resistant to wear under the circumstances of its use and shall be flexible so as to be capable of flexing under the influence of the force applying flexing means provided for that purpose as hereinafter set forth. The sheet material used may, or may not, be resilient in character, as rubber, as this characteristic is not of critical importance. In actual use with pyrite fines, as aforesaid, a ⅛" thick rubber sheet has been found to operate quite successfully, this data being given by way of example only and is not intended to limit the scope of the present invention.

While the lining could be made in one piece as an annular body of cylindrical shape of substantially the same outside diameter as the inside diameter of the drum, it is preferred to make the lining of a plurality of panels which may be parts of a single integral sheet, or may be made from several independent sheets as desired. As shown in Figs. 1 and 2, there are six such panels indicated at 15, 16, 17, 18, 19 and 20. These panels are each secured around its entire periphery to the inside of the drum by suitable means including, for example, a ring-shaped member 21 at each end thereof suitably securing the several panels to the inside of the drum and holding them in place in any suitable way (not shown). There is also provided a plurality of longitudinally extending bars 22, each of which serves to secure the edges of adjacent panels to the inside of the drum. Between the secured peripheral portions of each panel, and except for such peripheral portions each panel is free to move with respect to the drum as it is unattached thereto.

While it might theoretically be possible to rely upon the material of the flexible panels itself to cause a flexing thereof away from contact with the inside of the drum, it is preferred in accordance with the present invention that some *mechanical* force applying means be provided, which may or will be caused to move the lining with respect to the drum by flexing the free portions thereof preferably during each revolution of the drum. It is contemplated, for example, that this force applying flexing means [may be either a mechanical means or a fluid pressure means; and if mechanical] may be gravity actuated as hereinafter more particularly described, or positively actuated, for example, in response to the rotation of the drum.

In the form of the invention particularly shown in Figs. 1 and 2, the lining flexing means each consist of a metallic chain 23 of relatively heavy construction, secured at its ends to the drum at points 24 and 25. It will be noted that the points 24 and 25 are spaced apart longitudinally of the drum by a distance less than the entire length of the drum and further that this distance between the points 24 and 25 is substantially less than the length of the chain 23. Thus, each of the chains 23 will sag between its points of support during the passage of each chain through the upper portion of the orbital path thereof, as shown in Figs. 1 and 2, thereby flexing the adjacent free portion of the lining during this time due to the sagging of the chain as clearly shown in the drawings. In this way a gravity actuated means is provided, which will absorb but little power over and above the amount necessary for the rotation of the drum and its content of material to be treated. At the same time, during each rotation of the drum, the several free portions of the lining will be independently flexed tending to dislodge material accumulated thereon. It has been found in actual operation that this arrangement is quite effective in preventing the accumulation of material upon the drum lining.

In Fig. 2 a feature is best illustrated, namely, that of providing recesses adjacent to the points of support of the swingable flexing means, i. e., the chains 23, these recesses being shown, for example, at 26 and being located in respect to the points of support of the chains as they would be if the drum as seen in Fig. 2 were rotated in a counterclockwise direction. These recesses 26 are open to the interior of the drum and are so positioned and dimensioned that the chains 23 which are mounted respectively adjacent thereto, will position themselves in and be received by the recesses as shown in the lower portion of Fig. 2 during the movement of the chains and recesses through the lower part of their orbital path. This permits the flexible lining 14 to conform to the substantially cylindrical inner contour of the drum 10 (neglecting the recesses 26) during the passage through the lower part of the orbital path of the part of the drum in which the charge is active in the forming of nodules or pellets in the particular example above described. This may be desired in some installations; although it is contemplated that for other purposes the recesses 26 may be omitted as illustrated for other forms of the invention hereinafter described.

Turning now to the form of the invention shown in Fig. 3, the drum 10 and its mounting and rotating means may be the same as have been described above as to the form of Figs. 1 and 2. Also, the lining 14 may be the same as previously described, so that the parts thus far described of Fig. 3 are given the same reference numbers. The difference between this form of the invention and that previously described is that where the form of the invention of Figs. 1 and 2 utilize a single length of chain associated with and positioned approximately midway of each of the panels 15 through 20, the form of the invention shown in Fig. 3 utilizes in conjunction with each panel of the lining one or more short lengths of relatively heavy chain indicated at 27. Alternatively, each of these chains could carry a weight (not shown) on the free end thereof, such a construction being in effect the equivalent of a heavier chain. In this form of the invention each short length of chain 27 is attached to the inside of the drum at one end only as shown at 28, Fig. 3. This attachment may be effectuated in any desired manner not particularly illustrated. While there is shown but one series of the short lengths of chain 27 in Fig. 3, it will be understood that several of these chains may be placed in a row longitudinally of the drum for each of the panels 15 to 20 inclusive.

In this form of the invention no recesses corresponding to 26 Fig. 2 are shown, so that the chains 27 when passing through the lower portions of their paths, opposite panel members 18, 19 and 20 as seen in Fig. 3 will rest against the inside of the drum and cause the adjacent portion of the lining to be deflected somewhat out of a truly cylindrical shape. This type of construction may be found desirable in order that the special drum shape including the recesses 26 be not required. Thus, a conventional drum such as is readily available on the market may be used in the construction of an apparatus as shown in Fig. 3; while the drum of Figs. 1 and 2 with the recesses 26 therein would require special manufacture and would not be available on the market generally, but only on special order. While the drum of Fig. 3 is itself substantially cylindrical, due to the absence of the recesses 26, the lining will assume a somewhat wavy form. This has been found to be fully operative; and it is believed that as long as the material being treated can be made to roll, it will be effective even for forming nodules in accordance with the particular use for the present invention herein described. The operation of the device of Fig. 3 will be obvious from the foregoing description.

Turning now to the form of the invention shown in Figs. 4 and 5, the construction of the drum, its mounting and its lining generally is substantially the same as in previous figures, so that the parts are given the same reference characters. This form of the invention differs from previously described forms in that the means for applying force for flexing the lining comprises an elongated rigid member 29, which is connected to the inside of the drum at two or more points by flexible, connecting means, each of which is shown in the accompanying drawings as a short length of chain 30, two such connecting means being provided as shown for each member 29. The members 29 are preferably bars, rods or pipes having *substantial* [substantialy] weight, such as metallic members, hollow or otherwise. These members 29 are preferably somewhat shorter than the length of the drum 10 and are disposed longitudinally thereof adjacent to portions of the lining 14 which are free to move with respect to the drum. As shown, there is one of these swingable means including a member 29 and its supporting means 30 for each of the panels 15 to 20 inclusive. The suspension means for each of the members 29 may be of any desired type, preferably such that the members 29 may swing in respect to the drum 10 under the influence of gravity, as will be obvious from the accompanying drawings. Short lengths of chain have been found eminently satisfactory for this purpose, although other constructions, essentially equivalent thereto, may be substituted, as will be obvious to those skilled in the art from the present description. The chains 30 are connected to points on the inside of the drum 10 in any desired way, not specifically illustrated. The points of suspension of the chains 30 in respect to the drum 10 are spaced apart substantially the same distance as the points where these chains are connected to the respectively associated members 29. Thus, each member 29 may swing incident to the rotation of the drum as shown best in Fig. 5. While there are not illustrated any recesses in Figs. 4 and 5 corresponding to the recesses 26 in Fig. 2, it will be obvious that such recesses could be provided in conjunction with a swingable means as shown at 29 and 30 in the same way as these recesses are provided in conjunction with the chains 23 of the form of the invention shown in Figs. 1 and 2.

[The form of the invention shown in Figs. 6 and 7 is one in which fluid pressure is used to supply the force required for flexing the lining or portions thereof. While this fluid pressure could conceivably be hydraulic, it is usually preferred to use pneumatic pressure (air), as then the exhaust may communicate directly with the atmosphere and the mechanism be correspondingly simplified.]

[In Figs. 6 and 7 there is illustrated an apparatus by which pneumatic pressure, which is adapted to be supplied from any suitable source thereof (not shown), may be distributed to each of the lining panels in a device in which there are a plurality of such panels making up the lining as set forth above and as illustrated, for example, in Figs. 1 to 5 inclusive. Broadly, the means disclosed comprises a means for distributing fluid pressure from a suitable source to each of the spaces between one of the panels 15 to 20 inclusive and the drum 10. A distributing valve is provided not only for the distribution of the fluid pressure, but also for the exhaust thereof, so that each panel is intermittently flexed by the supplying of pressure thereto and permitted to collapse to conform to the shape of the drum, by the exhaust of fluid pressure therefrom. It will be understood as aforesaid, that each panel is secured to the drum around its entire periphery in a substantially air-tight manner as aforesaid, so that pressure, supplied to the space behind the panel and bounded by this periphery, will be effective to flex the panel and thereby will tend to dislodge material accumulated on the interior surface thereof.]

[As shown, there is provided a rotary distributing valve formed in part by a semi-circular housing 31, which may be formed rigid or integral with a suitable standard or support 32 and which is arranged partly to surround a rotatable valve member 33. The rotatable member 33 is preferably driven in timed relation with the rotation of the drum. There is illustrated a simple apparatus for rotating the member 33, comprising a supporting portion 34 securing the member 33 to the drum 10 in a position coaxial thereof and at one end. The housing 31 of the valve may be connected to a source of fluid pressure (not shown) through a passage or pipe 35, which is arranged to communicate with a groove 36 of limited extent, which is formed in the housing 31 facing the member 33 as shown in Figs. 6 and 7. This groove will be opposite a portion of the rotatable member 33 of the valve, which is provided with a plurality of ports 37, some of which are at all times in registry with the groove 36. Others of these ports are always in direct communication with the atmosphere. Thus, as the ports 37 respectively communicate through pipes 38 with spaces behind the several panels 15 to 20 inclusive, it will be seen that some of the panels will at all times be supplied with pressure, while others will be exhausted to the atmosphere; and that each panel will be intermittently supplied with pressure and exhausted during each revolution of the drum to effect the same type of operation as was effected in the several forms of the invention hereinabove described.]

[In the event that liquid, rather than gaseous pressure, were used, a housing similar to the member 31 (or an extension of that member completely around the member 33) could be employed in communication with others of the ports 37, which are shown in Figs. 6 and 7 to communicate with the atmosphere.]

[The valve member 33 may be retained in position as shown by annular ring member 39 suitably secured to the member 31 or to the standard 32 as by a plurality of bolts 40. The operation of this device should now be obvious from the foregoing description.]

Considering now Fig. 6 [8] of the drawings, there is illustrated a device in which the flexing of the lining or lining portions is effected by positively acting mechanical means, preferably in response to the rotation of the drum 10. The drum may be constructed in the same way as has previously been described in respect to other forms of the invention, the parts being given the same reference characters for this reason.

In this form there are elongate members 41, one for each of the panels 15 through 20 inclusive. These members 41 are preferably arranged and disposed in the spaces between the lining 14 and the drum 10. Each member 41 is mounted for movement in respect to the drum 10 in a substantially radial direction, as by providing thereon a rigid stud member 42, which is slidably received in a suitably shaped guideway in the drum 10, here shown as provided with an annular flange or collar 43. While there is shown but one stud member 42 on each of the members 41, it will be understood that two or more such studs or equivalent guide means could be provided if desired in order to prevent any lateral movement between member 41 and the drum. The member 42 may be non-circular or provided with a key or keyway in a well known manner for the same purpose.

In order to provide the force required to move the member 41 positively in both directions, any suitable mechanical means may be used, preferably deriving its power from the power supplied to rotate the drum 10. There is illustrated a very simple means for this purpose, comprising a stationary annular member 44, which may be positioned substantially as shown and supported in any suitable manner not particularly illustrated. This member 44 is provided with a cam groove 45 in which rollers 46, respectively secured to the several stud members 42, are arranged to travel. Thus, by properly designing the cam groove 45, it will be seen that one or more reciprocations of each of the members 41 may be provided during each revolution of the drum 10.

The means provided, such as the cam means described, may be designed to effect the same type operation which results from use of the devices shown in Figs. 1 to 5 inclusive, that is, wherein each lining portion or panel will be flexed once during each revolution of the drum and particularly during the movement of such panel through the upper portion of its revolution. While each panel moves through the lower half or portion of its revolution, the members 41 may be retracted to a maximum extent, so that the lining 14 may then conform substantially to the contour of the inside of the drum.

If desired, recesses corresponding to those shown in Fig. 2 at 26, could be provided to receive the members 41 in their retracted positions.

The spaces between the several panels 15 to 20 inclusive and the drum, in the instances in which these spaces are sealed completely at the peripheries of the several panels, should also be vented to the atmosphere, so as to permit the free flexing of the flexible lining portions without interference by atmospheric pressure or the lack of it. For this reason apertures 47 may be provided in the drum at suitable places. Corresponding apertures also numbered 47 may be provided in other forms of the invention, as shown for example, in Figs. 1 and 4. [Such apertures are, of course, unnecessary and undesired in the form of Figs. 6 and 7 as the operation of that form of the device is effected by pneumatic pressure.] In some embodiments of the invention wherein the lining is not attached by an airtight seal around its entire periphery, the vent apertures 47 are not necessary and may be omitted.

While several different types of lining flexing means have been shown and described, other equivalent types will occur to those skilled in the art from the foregoing description. All such equivalents are to be considered within the purview of the present invention as defined by the appended claims, which are to be construed validly as broadly as the state of the prior art permits.

What is claimed is:

1. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material *which is substantially impervious to said material and which is* secured to said drum at least at its peripheral portions and having a major part of its area bounded by said peripheral portions free to move in respect to said drum; and *mechanical* means associated with the part of said lining which is free to move in respect to said drum *and including a movable portion located between said drum and said lining* to exert *mechanical* force intermittently upon the outer surface of the sheet material of said lining facing the rigid drum for intermittently *mechanically* flexing the sheet material of said lining by intermittently *mechanically* moving it in respect to said drum, thereby tending to dislodge material accumulated on the inner surface of said lining.

2. Apparatus in accordance with claim 1, wherein said force exerting means is made effective in response to the rotation of said drum and is effective to flex said lining at least once during each revolution of the drum.

3. Apparatus in accordance with claim 1, wherein said force exerting means is made effective in response to the rotation of said drum and is effective to flex said lining at least once during each revolution of the drum, and wherein the force applied to flex said lining is derived from energy applied to rotate said drum.

4. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material *which is substantially impervious to said material and which is* secured to said drum, at least at its peripheral portions, and having a major part of its area bounded by said peripheral portions free to move in respect to said drum; and a plurality of mechanical means, each of which is swingably secured to and rotatable with said drum, has a movable portion located between said drum and said lining, and is respectively opposite a portion of said lining which is free to move in respect to said drum; said swingably secured means moving during the rotation of said drum to flex the lining portion respectively adjacent thereto and thereby tending to dislodge material accumulated on said lining.

5 Apparatus in accordance with claim 1, wherein said lining comprises a plurality of panels of flexible material, each secured around its entire periphery to said drum and each extending longitudinally of said drum, and wherein there is at least one of said force exerting means cooperating with each of said panels for dislodging material therefrom.

6. Apparatus in accordance with claim 1, wherein said lining comprises a plurality of panels of flexible material, each secured in an air-tight manner around its entire periphery to said drum and each extending longitudinally of said drum, and wherein there is at least one of said force exerting means cooperating with each of said panels for dislodging material therefrom, and comprising in addition, at least one means respectively associated with each of said panels for venting to the atmosphere through said drum the space between each panel and said drum and within the periphery of each said panel.

7. Apparatus in accordance with claim 4, wherein each of said swingably secured means is mounted wholly within said drum and is secured thereto, and wherein said swingably secured means are moved solely by gravity.

8. In a rotary drum apparatus for treating a material containing fines in a form in which the material tends to adhere to and accumulate on the walls of the apparatus, means for preventing such accumulation, comprising a rotatable drum of rigid construction and substantially cylindrical inside shape, a lining of flexible sheet material secured to said drum at least at its peripheral portions and having a major part of its area bounded by said peripheral portions free to move in respect to said drum, a plurality of lining deflecting means, each of which is free to move with respect to said drum and has at least a portion thereof located between said drum and a portion of said lining which is free to move in respect to said drum to flex the lining portion respectively adjacent thereto and thereby tending to dislodge material accumulated on said lining, and an inwardly open recess formed in said drum respectively adjacent to each of said lining deflecting means for receiving said deflecting means respectively as the recesses pass through a predetermined part of their paths in the rotation of said drum, so that said lining may conform substantially to the substantially cylindrical inside shape of said drum when said deflecting means are located in said recess.

9. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material secured to said drum at least at its peripheral portions and having a major part of its area bounded by said peripheral portions free to move in respect to said drum; and a plurality of means for flexing the portions of said lining respectively adjacent thereto, thereby tending to dislodge material accumulated on said lining, each of said flexing means comprising a chain secured at its ends to the inside of said drum outside said lining, the points of support at which each said chain is secured to said drum being spaced apart longitudinally of said drum and by a distance substantially less than the length of the chain connected between said points, so that the sagging of the chains between their respective points of support will flex the adjacent portions of the lining during each revolution of said drum.

10. Apparatus in accordance with claim 9, wherein said drum has a substantially cylindrical inside contour, and comprising in addition, a plurality of inwardly-open, elongated recesses formed in said drum, said recesses being located respectively adjacent to the positions of each of said chains as determined by the points where said chains are respectively secured to said drum for receiving said chains as said recesses are revolved by the rotation of said drum through a portion of their paths below the center of rotation of the drum, so that said lining may conform substantially to the cylindrical inside contour of the drum in this portion of its travel incident to the rotation of the drum.

11. In a rotary drum apparatus for treating a material containing fines in a form in which the material tends to adhere to and accumulate on the apparatus, means for preventing such accumulation, comprising a rotatable drum of rigid construction, a linging of flexible sheet material for said drum, said lining being made up of a plurality of panels, each secured in an air-tight manner around its entire periphery to said drum, each extending longitudinally of said drum substantially from end to end thereof, and each of said panels being free to move in respect to said drum except as it is secured thereto at its periphery; means associated with each of said panels for flexing the portion thereof which is free to move with respect to said drum, each of said flexing means comprising a metallic chain connected at its ends to points on the inside of said drum and which points are spaced apart longitudinally thereof by a distance less than the length of each said chain, so that the sag of said chains between their ends may be effective to flex the respectively associated panels during each revolution of the drum, and means for venting to the atmosphere through said drum the space between each of said panels and said drum.

12. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material secured to said drum at least at its peripheral portions and having a major part of its area bounded by said peripheral portions free to move in respect to said drum; and a plurality of means for flexing the portions of said lining respectively adjacent thereto and which are free to move in respect to said drum, thereby tending to dislodge material accumulated on said lining, each of said lining flexing means comprising a short length of a heavy metallic chain secured at one end to the inside of said drum and free to swing under the influence of gravity except as thus secured, said lining flexing means being secured at predetermined spaced points around said drum respectively, so as to flex different portions of said lining incident to the swinging of each said chain during each revolution of said drum.

13. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material secured to said drum at least at its peripheral portions and having a major part of its area bounded by said peripheral portions free to move in respect to said drum; and a plurality of means for flexing the portions of said lining respectively adjacent thereto which are free to move in respect to said drum, thereby tending to dislodge material accumulated on said lining, each of said lining flexing means comprising a relatively long metallic member disposed longitudinally of said drum and connected thereto at least at points adjacent to each end of said member by relatively short, flexible connection means, whereby each said member will swing under the influence of gravity about the points where said connection means are connected to said drum during each revolution thereof for flexing the adjacent portions of said lining respectively.

14. Apparatus in accordance with claim 13, wherein said lining is made up of a plurality of panels, each connected around its entire periphery to the inside of said drum in a substantially air-tight manner and otherwise free to move in respect thereto and each extending longitudinally of said drum substantially from end to end thereof; wherein one of said relatively long metallic members is provided as aforesaid for each of said panels and is located at about the center thereof considered circumferentially of said drum, the longitudinal axis of each of said members being always substantially parallel with the longer dimensions of said panels and with the axis of rotation of said drum; wherein each of said relatively short, flexible connection means is a short length of metallic chain; and wherein means are provided for venting to the atmosphere the space between each of said panels and said drum.

[15. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material secured to said drum in a substantially fluid-tight manner at least at its peripheral portions and having a major part of its area bounded by said peripheral portions free to move in respect to said drum, thereby providing at least one closed space between said lining and said drum; and means associated with the parts of said lining which is free to move in respect to said drum to exert force intermittently upon the outer surface of the sheet material of said lining facing the rigid drum for intermittently flexing said lining by intermittently moving it in respect to said drum, the last named means comprising means for intermittently supplying and venting fluid pressure to and from the space between said lining and said drum.]

[16. Apparatus in accordance with claim 15, wherein said lining is made up of a plurality of panels, each connected around its entire periphery to the inside of said drum in a substantially air-tight manner and otherwise free to move in respect thereto, so as to provide a plurality of separate spaces between said panels respectively and said drum, and each of said panels extending longitudinally of said drum substantially from end to end thereof; wherein the fluid pressure applied to flex said lining is pneumatic pressure; and wherein there is a rotary pressure distributing valve adapted to be supplied from a source of pneumatic pressure and having at least one exhaust connection to the atmosphere and connected to each of said spaces, and means for rotating a rotatable part of said pressure distributing valve in response to rotation of said drum, whereby each of said panels is flexed by pressure and deflated by the venting of such pressure at least once during each revolution of said drum.]

17. In a rotary drum apparatus for treating a material containing fines in a form in which the material tends to adhere to and accumulate on the walls of the apparatus, means for preventing such accumulation, comprising a rotatable drum of rigid construction, a lining of flexible sheet material secured to said drum at least at its peripheral portions and having a major part of its area bounded by said peripheral portions free to move in respect to said drum; and means associated with the part of said lining which is free to move in respect to said drum to exert force intermittently upon the outer surface of the sheet material of said lining facing the rigid drum for intermittently flexing said lining by intermittently moving it in respect to said drum, the last named means comprising at least one member carried by said drum and mounted for movement in respect thereto and located at least in part between said drum and a portion of said lining which is free to move in respect to said drum, and means for positively mechanically moving said member in respect to said drum so as to flex said lining at least once during each revolution of said drum and in response to the rotation of said drum.

18. Apparatus in accordance with claim 17, wherein said lining is made up of a plurality of panels, each connected around its entire periphery to the inside of said drum in a substantially air-tight manner and otherwise free to move in respect thereto, and each of said panels extending longitudinally of said drum substantially from end to end thereof; wherein there is one of said members associated with each of said panels, and each said member comprises an elongate bar aligned with the longer dimension of one of said panels respectively parallel to the axis of rotation of said drum; wherein the means for positively mechanically moving each said member comprises a stationary cam surrounding said drum, and cam followers cooperating with said cam and mechanically connected to said members respectively; and wherein means are provided for venting to the atmosphere the space between each of said panels and said drum.

No references cited.